(12) United States Patent
Volkov et al.

(10) Patent No.: US 11,074,535 B2
(45) Date of Patent: Jul. 27, 2021

(54) BEST WORKER AVAILABLE FOR WORKER ASSESSMENT

(71) Applicant: WorkFusion, Inc., New York, NY (US)

(72) Inventors: Andrii Volkov, Staten Island, NY (US); Maxim Yankelevich, New York, NY (US); Mikhail Abramchik, Minsk (BY); Abby Levenberg, New York, NY (US)

(73) Assignee: WorkFusion, Inc., New York, NY (US)

( * ) Notice: Subject to any disclaimer, the term of this patent is extended or adjusted under 35 U.S.C. 154(b) by 891 days.

(21) Appl. No.: 15/135,518

(22) Filed: Apr. 21, 2016

(65) Prior Publication Data

US 2017/0185944 A1 Jun. 29, 2017

Related U.S. Application Data

(60) Provisional application No. 62/272,246, filed on Dec. 29, 2015.

(51) Int. Cl.
*G06Q 10/00* (2012.01)
*G06Q 10/06* (2012.01)
*G06Q 30/00* (2012.01)

(52) U.S. Cl.
CPC ... *G06Q 10/06398* (2013.01); *G06Q 10/0633* (2013.01); *G06Q 10/06393* (2013.01); *G06Q 10/06395* (2013.01); *G06Q 10/063112* (2013.01); *G06Q 10/063114* (2013.01); *G06Q 30/0185* (2013.01)

(58) Field of Classification Search
USPC ........................................................ 705/7.14
See application file for complete search history.

(56) References Cited

U.S. PATENT DOCUMENTS

| | | | | |
|---|---|---|---|---|
| 7,606,778 B2 * | 10/2009 | Dewar | ........... | G06Q 10/063112 706/21 |
| 2006/0224254 A1 * | 10/2006 | Rumi | ................. | G05B 13/0275 700/28 |
| 2009/0204471 A1 * | 8/2009 | Elenbaas | ................ | G06Q 10/06 705/7.13 |

(Continued)

OTHER PUBLICATIONS

Lu, J., Behbood, V., Hao, P., Zuo, H., Xue, S., & Zhang, G. (2015). Transfer learning using computational intelligence: A survey. Knowledge-Based Systems, 80, 14-23. (Year: 2015).*

(Continued)

*Primary Examiner* — Joseph M Waesco
*Assistant Examiner* — Jay-Ming Wang
(74) *Attorney, Agent, or Firm* — Baker Botts L.L.P.

(57) ABSTRACT

Particular embodiments may receive, by one or more processors of an information processing system, results of a benchmark task performed by a set of one or more workers. Performance of each of the workers in the set on the benchmark task may be determined. One or more best workers of the workers in the set may be selected. Particular embodiments may then determine whether at least one of the best workers is available for a new task. If one of the best workers is available, the new task may be assigned to the available best worker; else the new task may be assigned to a random worker.

19 Claims, 7 Drawing Sheets

(56) References Cited

U.S. PATENT DOCUMENTS

| | | | |
|---|---|---|---|
| 2012/0011170 A1* | 1/2012 | Elad | G06Q 10/10 707/804 |
| 2012/0029963 A1 | 2/2012 | Olding | |
| 2012/0179617 A1* | 7/2012 | Adams | G06Q 10/02 705/321 |
| 2013/0111488 A1 | 5/2013 | Gatti | |
| 2014/0032451 A1* | 1/2014 | Ben-Hur | G06N 20/00 706/12 |
| 2014/0074545 A1 | 3/2014 | Minder | |
| 2014/0122188 A1 | 5/2014 | Van Pelt | |
| 2014/0195290 A1 | 7/2014 | Plost | |
| 2014/0229164 A1* | 8/2014 | Martens | G06F 40/40 704/9 |
| 2014/0278657 A1* | 9/2014 | Horvitz | G06Q 10/063118 705/7.17 |
| 2014/0344271 A1* | 11/2014 | Bartram | G06Q 10/10 707/737 |
| 2015/0095080 A1* | 4/2015 | Gatti | G06N 20/00 705/7.14 |
| 2015/0356488 A1* | 12/2015 | Eden | G06Q 10/06395 705/7.41 |
| 2016/0132787 A1* | 5/2016 | Drevo | G06N 20/10 706/12 |
| 2016/0162478 A1* | 6/2016 | Blassin | G06Q 10/06311 706/12 |
| 2016/0292248 A1* | 10/2016 | Garcia | G06Q 10/067 |
| 2017/0185935 A1* | 6/2017 | Volkov | G06Q 10/06398 |
| 2017/0323233 A1* | 11/2017 | Bencke | G06N 20/20 |

OTHER PUBLICATIONS

Fassi, Mehdi & Bocquet, Valery & Majery, Nicole & Lair, Marie-Lise & Couffignal, Sophie & Mairiaux, Philippe. (2013). Work ability assessment in a worker population: Comparison and determinants of Work Ability Index and Work Ability score. BMC public health. 13. 305. 10.1186/1471-2458-13-305. (Year: 2013).*

International Search Report and Written Opinion for International Application PCT/US2016/068176, dated Jul. 18, 2017.

* cited by examiner

| ID | TITLE | KEYWORDS | TYPE | REWARD | # OF ASSIGNMENTS | SCHEDULE | WORKER SPECS | WORKER QUALITY | RULES | |
|---|---|---|---|---|---|---|---|---|---|---|
| TASK_1 304 | TITLE_A 308 | TAG, BLOG 312 | CATEGORIZATION 316 | $0.02 320 | 3 324 | N/A | N/A | HIGH 336 | RULE_1 340 | ... |
| TASK_2 | TITLE_B | ANALYZE CODE | VALIDATE | $0.05 | 5 | 1 WEEK 328 | SOFTWARE 332 | N/A | N/A | ... |
| ... | ... | ... | ... | ... | ... | ... | ... | ... | ... | ... |

FIG. 3

BEST WORKER AVAILABLE FOR WORKER ASSESSMENT

PRIORITY

This application claims the benefit, under 35 U.S.C. § 119(e), of U.S. Provisional Patent Application No. 62/272,246, filed 29 Dec. 2015, which is incorporated herein by reference.

TECHNICAL FIELD

Embodiments of the present invention generally relate to workforce management, and more particularly relate to assessment of worker fitness.

BRIEF DESCRIPTION OF THE DRAWINGS

The accompanying figures, where like reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 3 is a table illustrating one example of task data according to one embodiment of the present invention;

DESCRIPTION OF EXAMPLE EMBODIMENTS

Workforce Management System

Figure 1:
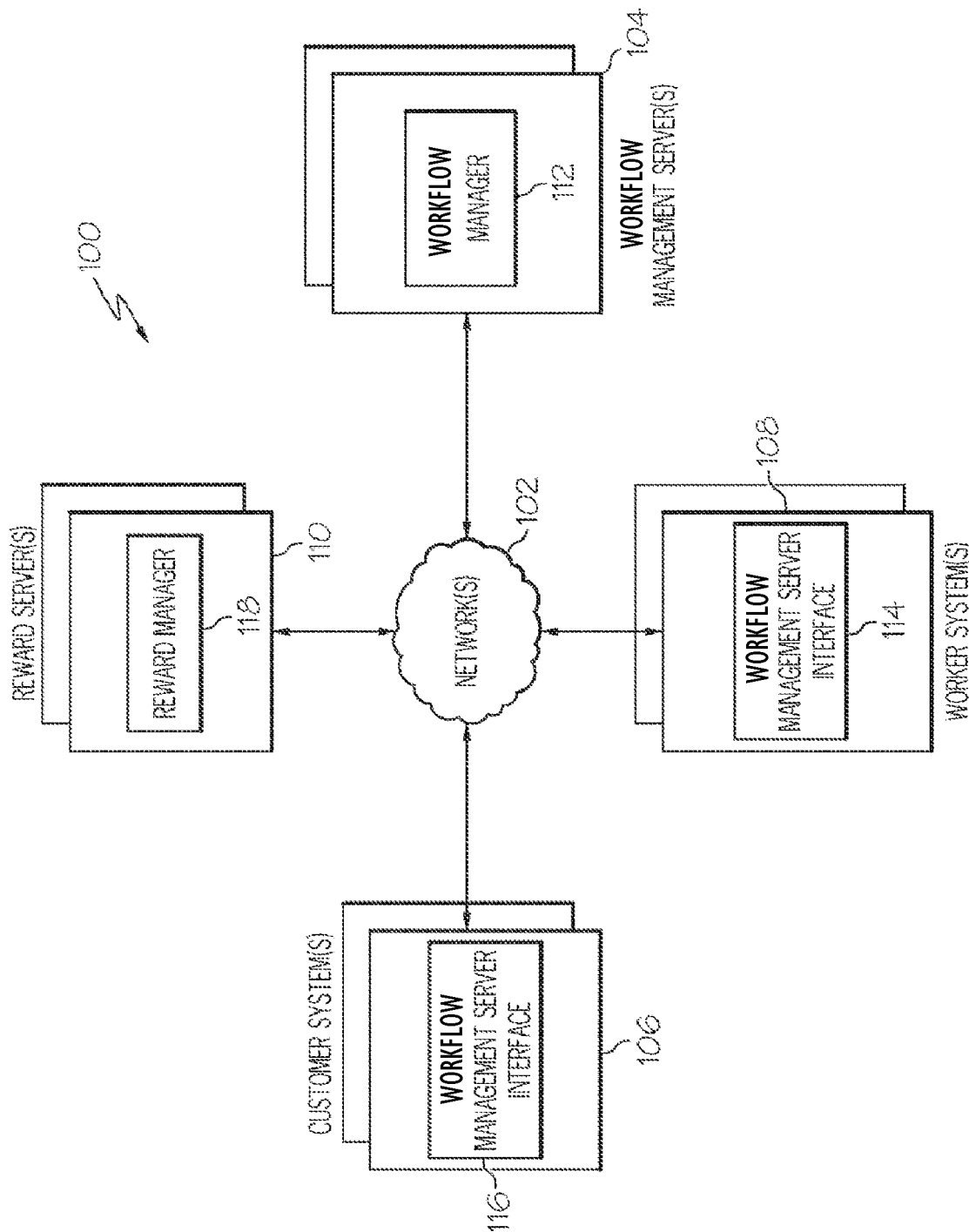
FIG. 1 is a block diagram illustrating one example of a workforce management system according to one embodiment of the present invention.

FIG. 1 shows one example of a workforce management system 100 according to one embodiment of the present invention. The workforce management system 100 comprises one or more networks 102 that, in one embodiment, may include wide area networks, local area networks, wireless networks, and/or the like. It should be noted that the network 102 comprises various networking hardware (and software) components such as gateways, routers, firewalls, etc., which are not shown for simplicity. The environment 100 includes a plurality of information processing systems 104, 106, 108, 110 that are communicatively coupled to the network(s) 102. The information processing systems 104, 106, 108, 110 include one or more workforce management servers 104, one or more customer systems 106, one or more worker systems 108, and one or more reward management servers 110 (or payment systems 110). The environment 100 may also include additional systems such as admin systems, database systems, storage systems, etc., which are not shown in FIG. 1. Users of the worker systems 106 and customer systems interact with the workforce management server 104 via an interface 114, 116 or programmatically via an API(s).

Throughout this discussion a "customer" refers to an entity that submits/creates a task to the workforce management server 104 to be sourced (e.g., published, broadcasted, advertised, etc.) to a set of one or more workers. This set of one or more workers may be referred to as a "crowd". Workers may be comprised of a cohesive or disparate group of individuals. A "task" (also referred to as a "problem") comprises one or more actions to be performed by the workers. The result of the workers performing these requested actions may be referred to as the "output" or "result" of the task, the "work product" of a worker", or the "solution" to the problem. A "project" refers to a plurality of related tasks.

The workforce management server 104 comprises a workforce manager 112. The customer and worker systems 106, 108 comprise the interfaces 114, 116 discussed above. The reward server 110 comprises a reward manager 118 for managing the awarding of rewards to workers. The workforce manager 112 of the server 104 manages a workforce management environment provided by the server 104 and also any interactions between customers/workers and the workforce management environment. This workforce management environment allows customers to manage tasks and allows workers to participate in tasks.

Figure 2:
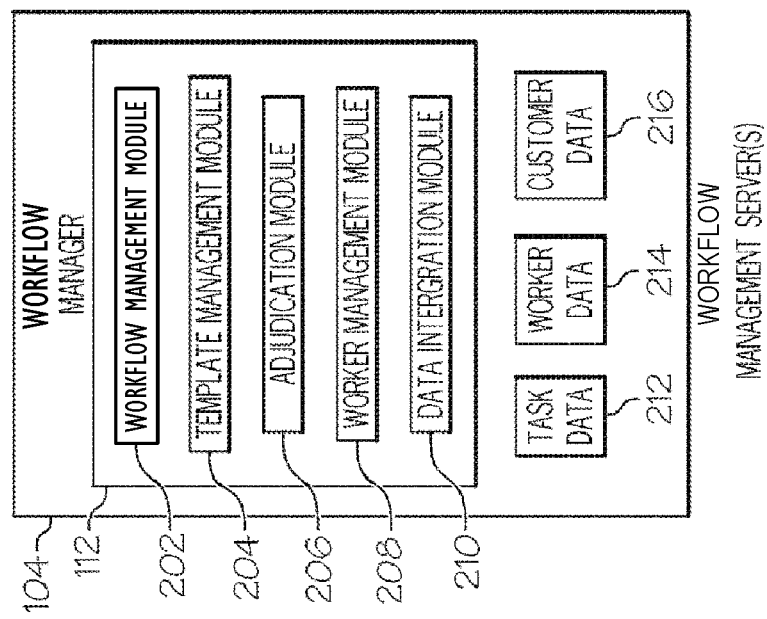
FIG. 2 is a block diagram illustrating a detailed view of a workforce management server according to one embodiment of the present invention.

As shown in in FIG. 2, the workforce manager 112, in one embodiment, comprises a workflow management module 202, a template management module 204, an adjudication module 206, a worker management module 208, and a data integration module 210.

The workflow management module 202 manages tasks and generates tasks for a workflow from information entered by a customer in one or more templates provided by the template management module 204. The workflow management module 202 maintains information associated with tasks as task data 212. This task data 212 may be stored within the workforce management server 104 and/or on one or systems coupled to the server 104. The template management module 204 provides various templates or screens for a customer or worker to interact with when accessing the workforce management server 104. The adjudication module 206 manages the results provided/submitted by a worker for a task. The adjudication module 206 utilizes one or more adjudication rules or acceptance criteria to ensure that the best results of a task are identified and/or to provide a degree of confidence in the correctness of a result.

The worker management module 208 manages the workers associated with the workforce management environment of the workforce management server 104. The worker management module 208 maintains information associated with workers as worker profiles 214. The worker profiles 214 may be stored within the workforce management server 104 and/or on one or more systems coupled to the server 104. The worker management module 208, in one embodiment, uses the worker profiles 214 for, among other things, determining which set of workers to present a given task to. The data integration module 210 interfaces with one or more customer servers (not shown) to provide the data to a worker upon which the task is to be performed. In addition to the above, the workforce management server 104 also comprises and maintains customer data 216. The customer data 216 comprises information associated with each customer that has registered with the workforce management server 104. The workforce manager 112 and its components are discussed in greater detail below. Specifically, a worker fitness module for analyzing answers to flag potentially incorrect responses is described below.

Worker Management Data

In certain embodiments, data regarding all aspects of worker management, including questions, answers, worker data, worker answer history, and the like, is stored as a feature, enabling machine learning algorithms to select specific traits and process them using, for example, pattern recognition, classification, and regression techniques, to improve automated processes and worker management predictions. A feature is an individual measurable property of a phenomenon being observed. However, since the workflow management system may maintain a large number of features, a subset of features are often selected to facilitate learning and improve generalization and interpretability. Selected features can thus be combined into a feature vector for processing and statistical analysis to facilitate machine learning.

FIG. 3 shows one example of the task data 212 maintained by the workflow management module 202. It should be noted that although FIG. 3 shows a single table 300 comprising records (i.e., rows) for each task a separate record/file may be stored for each task as well. Also, embodiments of the present invention are not limited to a table and other structures for storing data are applicable as well. Even further, one or more columns may be added and/or removed from the table 300 as well. The table 300 in FIG. 3 comprises a plurality of columns and rows, where each row is associated with a single task. A first column 302, entitled "ID", comprises entries that uniquely identify each task being handled by the workforce management system. For example, a first entry 304 under this column 302 identifies a first task with the unique identifier of "Task_1". The task ID may be automatically assigned by the workflow management module 202 upon creation of a task.

A second column 306, entitled "Title", comprises entries 308 that provide the title of the corresponding task. This title may be manually entered by the customer during the task creation/submission process or automatically generated by the workflow management module 202. It should be noted that the table 300 may also include an additional column (not shown) for providing a more detailed description of the task. A third column 310, entitled "Keywords", comprises entries 312 that comprise optional keywords for the corresponding task. These keywords allow the customer or worker to search for tasks being maintained by the server 104. It should be noted that tasks may be search for by the customer or worker based on any of the information shown (and not shown) in FIG. 3.

Keywords may be manually entered by the customer during the task creation/submission or automatically generated by the workflow management module 202. The workforce manager 112 may use the keywords to determine which tasks to publish/advertise to which workers. For example, a worker may include in his/her profile that he/she only wants to participate in tasks associated with a given type, category, keyword, technical area, etc. The workforce manager 112 may then match tasks to specific workers based on the worker's profile and the keywords associated with the task. In addition, the workforce manager 112 may analyze a worker's previous work history, work performance, qualifications, etc. and determine that the worker excels in a specific task area. The workforce manager 112 may use the keywords associated with a task to ensure that tasks associated with this specific task area(s) are published/advertised to the worker. It should be noted that the workforce manager 112 may utilize any of the information in the task data 212 for determining which workers to select for notification of a given task.

A fourth column 314, entitled "Type", comprises entries 316 that identify a task type for the corresponding task. For example, a first entry 316 under this column 314 indicates that Task_1 is a categorization task. Other non-limiting examples of a task type are rank, validate, or moderate. A task type may be manually assigned to a task by or automatically assigned by the workflow management module 202. A fifth column 318, entitled "Reward", comprises entries 320 that identify the type and/or amount of reward associated with the corresponding task. For example, a first entry 320 under this column 318 indicates that a worker will receive $0.02 for completing the corresponding task (or completing the corresponding task with the correct output, given amount of time, etc.). The reward may be monetary, merchandise, or any other type of reward selected by the customer. A sixth column 322, entitled "# of Assignments", comprises entries 324 that indicate a maximum number of workers that may participate in the task, a minimum number of workers that may participate in the task, a current number of workers currently participating in the task, and/or the like. For example, a first entry 324 under this column 322 indicates that the maximum number of unique workers that may participate in the corresponding task is 3. A seventh column 326, entitled "Schedule", comprises entries 328 that provide optional scheduling information for a corresponding task. Scheduling information may include a task duration (e.g., how long the task is available for), a work duration (e.g., how long a worker has to complete the task), sourcing schedule (e.g., a given date and/or time when the task is to be sourced), and/or the like.

An eighth column 330, entitled "Worker Specs", comprises entries 332 identifying optional workers' qualifications for the corresponding task. These worker specifications/qualifications may be any condition defined by the user that a worker must satisfy prior to being selected for or allowed to participate in a task. These qualifications may be education requirements, age requirements, geographic requirements, previous work history requirements (task or non-task related), previous task work performance, and/or the like. Previous task work performance may include metrics such as an average task completion time, average/number correct results, and/or any other metrics that may be used to represent a worker's work performance. The requirements under this column 330 may be used by the workflow management module 202 to select/filter workers for participation in the corresponding task. A ninth column 334, entitled "Worker Quality", comprises entries 336 identifying optional worker quality requirements for the corresponding task. A worker quality requirement identifies a specific quality rating/metric that must be associated with a worker in order for a worker to be selected for or allowed to participate in a task. This worker quality rating/metric is assigned to a worker by the worker management module 208 based various factors such as previous task work performance, duration of association with the crowd sourcing environment, and/or any other factor/metric that allows the worker management module 208 to assign a weight, rating, or metric that represents the overall quality of a worker.

A tenth column 338, entitled "Rules", comprises entries 340 that include or identify adjudication rules to be applied to the workers' output for a given task. The entries may comprise the actual rules or an identifier/flag that allows the adjudication module 206 to locate the applicable rules (e.g., acceptance criteria) in another table or storage area (not shown). An adjudication rule ensures that the best possible task result(s) is presented to a customer or that a given degree of accuracy and/or confidence may be associated with results provided by workers. For example, an adjudication rule may indicate that additional workers are to be assigned to a task until a given percentage/threshold of workers have provide the (substantially) same task result/solution and use the matching result as the final task result. An adjudication rule provides a way, for example, to determine the correctness of task results/solutions provided by workers.

FIG. 3 is merely one example of data maintained by a workflow management system or workflow management module 202. Example features in a workflow management system can include Task Features, HIT (Human Intelligence Task) features, Current Question/Answer Features, Previous Question/Answer Features, Question/Answer-level Worker Features, and Global Worker Features. While any relevant feature or attribute of any relevant phenomenon may be stored as a feature, a general listing of features is provided as an example.

Task Features
1. Task title—the title of the task.
2. Customer—the customer that initiated the task.
3. Created by—the handle of the person who created the task.
4. Tags—any tags set by author that describe the task.
5. Keywords—made available to the crowd workers to search for tasks.
6. Short Description—short abstract/description written for the task.
7. Question—the short text of the task question.
8. Qualification?—a binary flag indicating if this task required a worker qualification before starting.
9. Training?—was worker training required for the task.
10. FAQ/instructions—the text of any FAQ/instructions for this task.
11. HIT count—the total number of HIT in this task.
12. Messages/questions—count of how many messages/questions were sent for this task in total.
13. Use-case category—category set by the creator of the task as part of Task ontology.
14. Use-case—specific use-case of the task as part of Task ontology.
15. Number of questions—the number of questions per HIT on this task.
16. Average different answers—the average number of different answers per question on the task. So if all workers answer all questions the same the data here would be '1'. If some workers provide different answers then the value would be <1.
17. Percent of records delivered—how many of the total records were delivered to the customer. (Accepted=true).
18. Time before first accept—How long after publishing the task was the first HIT accepted.

HIT Features
1. Blocksize—The total number of questions in this HIT.
2. Cost—the pay out for this HIT.
3. Accepted—the total number of times this HIT was accepted.
4. Skipped—the number of times this HIT was skipped.
5. Complete—the number of workers that fully completed the HIT
6. Returned—the number of workers that didn't finish the HIT.
7. Time before returned—the total time spent on the HIT before it was returned.
8. Messages/questions—how many messages/questions were asked for this HIT.

Current Question/Answer Features
1. Current question type.
2. Questions remaining—The total number of questions that remain unanswered on the HIT after this question has been answered.
3. Question difficulty—measured by ART.
4. Is difficult?—if the difficulty of the question is > the average question difficulty.
5. Percentage of correct answers—the total number of correct answers/all attempted answers.
6. Percent of incorrect answers—the total number of incorrect answers/all attempted answers.
7. Question-level Average response time (ART)—the ART for this question over all workers.
8. Worker ART comparison—if the ART for this question is > the worker ART
9. 'Silver Worker' automated answer—if automation is available then the posterior probability of the ML model.
10. FAQs?—if any workers asked questions asked about the current question.
11. Answer name—the name of the answer.
12. Answer type—the type of answer for the question.
13. Answer description—any description of the answer.
14. Required?—was this answer required.
15. hasDefault?—if the answer has a default value.
16. Default value—the given default value for this answer.
17. Average different answers—the average number of different answers for this question.
18. Document length—The length of the document for which the question is being asked about.
19. Relative answer position—The relative position of the answer(s) in the current document. The index of the start of the answer is normalized by the document length.
20. Length of the input document for the tasks, e.g., size of the document to be used to perform information extraction
21. Relative start position of the answer in the document text as indicated by worker (i.e., what position in the document the beginning of the answer is).

Previous Question/Answer Features
1. Previous question types.
2. Previous question difficulty—how difficult was the last question answered.
3. Is previous question difficult—if the difficulty of the last question is > the average question difficulty.
4. Combined difficulty—if the last question and current question difficulties are both > the average question difficulty.
5. Previous correct—was the previous question answered correctly?
6. Previous skipped—was the previous question skipped?
7. Previous 'Silver Worker' answer—if automation is available then the posterior probability of the prior question from the model.
8. An additional 32 features that are the same as all above items for the last 5 questions answered.

Question/Answer-Level Worker Features
1. Worker ART—the ART for this worker.
2. ART ratio—the ART of this worker/the sum of ART for all workers
3. Number of correct answers so far.
4. Number of incorrect answers so far.
5. Number of questions left out so far.
6. Number of answers that matched the gold.

7. Number of correct answers so far/Number of incorrect answers so far.
8. Number of questions left out so far/Number of correct answers so far.
9. Number of incorrect answers so far/Number of correct answers so far.
10. Number of answers that matched gold/Total number of answers submitted.
11. Current task earnings—the amount the worker has earned so far on this task.
12. Current worker rank—the rank of the worker after completing the question.

Global Worker Features
1. Task Total—total number of tasks the worker has completed prior to this one.
2. Qualifications achieved—total number of tasks the worker has qualified for.
3. Qualifications attempted—total number of tasks the worker has attempted to be qualified for.
4. Average qualification score—the average score for all qualifications undertaken.
5. Number of qualifications achieved>=90.
6. Number of qualifications achieved>=80<90.
7. Number of qualifications<80.
8. Tiers of matching qualifications—how many of the same qualification has the worker achieved. We need to compute this as it's not in the system now.
9. Qualification level degraded—the amount of qualification score that the worker has fallen over time.
10. Historical accuracy—the historical accuracy of the worker over all completed tasks.
11. Historical gold accuracy—this historical gold accuracy of the worker over all completed tasks.
12. Historical worker rank—the rank of the worker on all prior tasks.
13. Messages/questions—how many messages/questions did this worker ask in total.
14. Bonus Amount—total amount of bonus money paid to the worker.
15. Percent correct per use-case category—total percent correct over all use-case categories the worker has completed.
16. Percent correct per use-case—total percent correct over all use-cases.
17. Average time per day—how many hours per day the worker spends on tasks on average.
18. Average time per task—how much time the worker spends per task on average.
19. Average time per category—how much time the worker spends per category on average.
20. Average time per use-case—how much time the worker spends per use-case on average.
21. Time away—time since the last task accepted.
22. Number of messages—how many times the worker received messaged by the task creator.
23. Worker country—the country the worker is working in.

In certain embodiments, a "task" is a collection of actions to be performed by workers. The result of the workers performing these requested actions may be referred to as the "output" or "result" of the task, the "work product" of a worker", or the "solution" to the problem. Tasks may also be described as a collection of "questions," each question having an "answer" supplied by the worker (e.g., either an automated or machine worker/process or "human" worker). A human task (i.e., "human implemented task" or "HIT") describes a task that is assigned for completion by a human worker. In certain embodiments, tasks may be assigned for an automated process that completes tasks based on a "learned" algorithm programmed, in some cases, using training data compiled from manually completed HIT. A "project" refers to a plurality of related tasks.

Answers may relate back to the question and/or task. For example, an answer may have a "type" field which is specified according to a "domain model" for the task. In certain embodiments, other attributes of the answer may relate back to attributes of question or task.

Figure 4A:
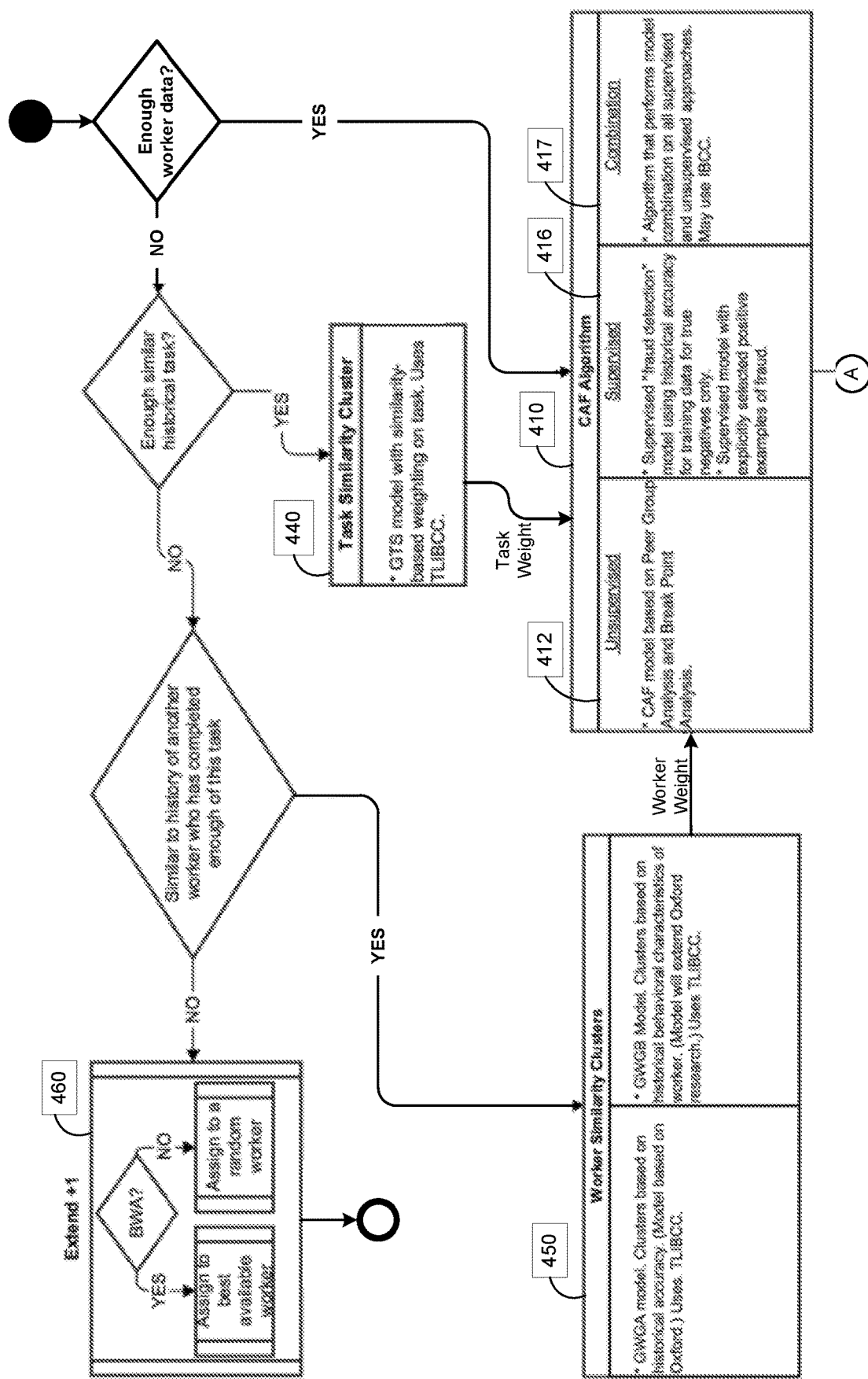
FIGS. 4A-4C depict a flow chart illustrating a process for checking answer accuracy using candidate for answer error detection according to one embodiment of the present invention.
Figure 4B:
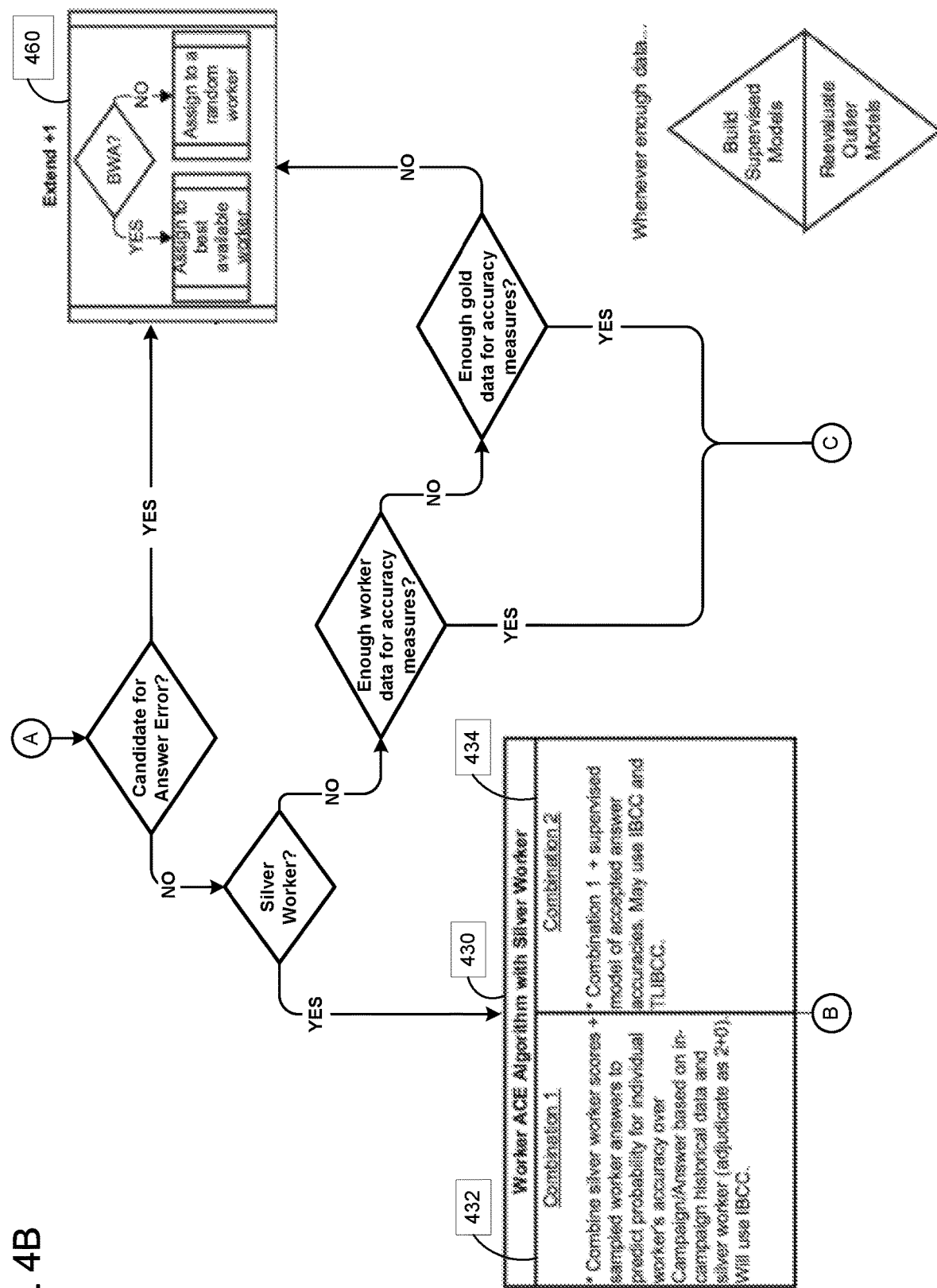
Figure 4C:
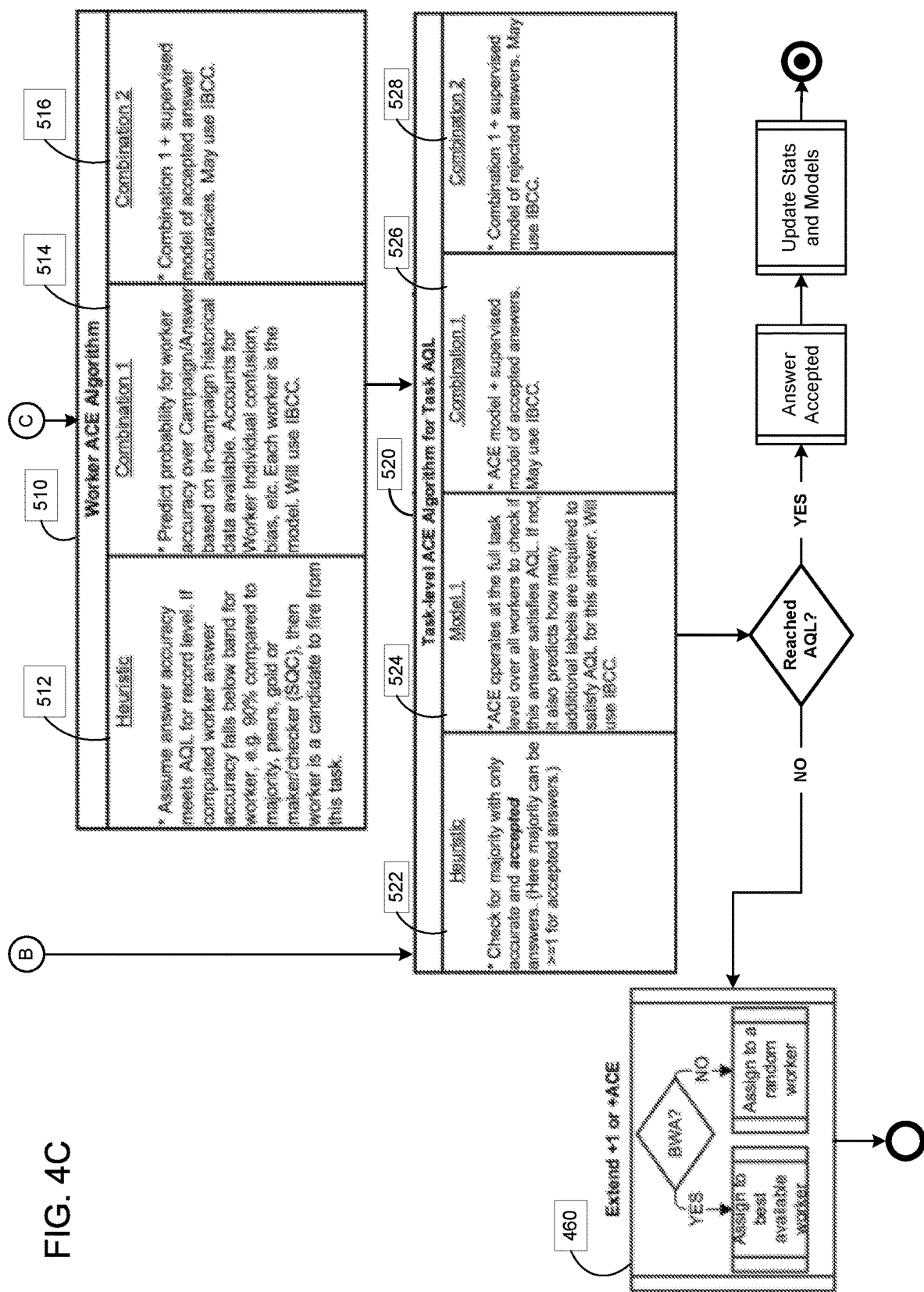

With reference to FIGS. 4A-4C, a flow chart illustrating a process for checking answer accuracy using candidate for answer error detection in accordance with a non-limiting embodiment of the present disclosure is shown. In certain embodiments, the inputs, outputs, and models referenced below may utilize some or all of the above listed features and any other type data collected. Acronyms shown in FIGS. 4A-4C may include the following:

ACE=Answer Confidence Estimation
CAF=Candidate Answer Fraud
GTS=Global Task Similarity
BWA=Best Worker Available
GWGA=Global Worker Guild Accuracy
GWGB=Global Worker Guild Behavioral Candidate for Answer Error Detection Module 410

The candidate for answer error detection module 410 handles all first-pass evaluation of a worker answer for detection of possible fraudulent, out-of-characteristic, or unreliable behavior, and sends the question directly for extension if required. This module predicts the likelihood of the current answer being incorrect or being submitted with the worker in a spamming state without making any attempt to answer the question correctly. "Spamming" may refer to a worker behavior where the worker submits answers in order to obtain some benefit (e.g., monetary rewards for answering questions) without regard to the correctness of the provided answers.

In certain descriptions, this module may be referenced as the Candidate Answer Fraud module or CAF module. However, as described in more depth below, while the algorithms used in the module may have originated in the fraud detection space, the algorithms are equally applicable to a wide array of error detection applications. Accordingly, "candidate for answer error detection," "candidate for answer fraud," and "CAF" may be used interchangeably in the context of the present disclosure.

At a high level it operates by comparing behavioral characteristic features of the current answer against characteristic features learnt on historical data for both accurate and inaccurate worker answers. If there is a large delta between a normally correct characteristic set of features for accurate answers or the features are similar to what is normal for an incorrect answer, the CAF model will flag this answer as high probability for spam.

The specific procedure for making the prediction and learning the comparison between the current answer and historical data may be done in multiple ways. It may be unsupervised and compared against statistical information of correct/incorrect characteristic classes at the crowd and/or individual worker level. Or it may be supervised and be trained against labelled examples of both correct/incorrect data. It could also combine the supervised and unsupervised approaches into a single prediction using ensemble combination approaches.

The term extension, as used herein, can refer to sending a question, record, or task to additional workers to obtain multiple answers for increasing confidence in the accepted answer. "Extensions" are required to reach an acceptable quality limit ("AQL") for the answer in cases when single producer (worker) cannot statistically produce required quality of the answers. AQL refers to the upper bound of how many errors are allowed in the final delivered data to a client.

The terms "fraud" and "error" as used herein are interchangeable and are not limited to their traditional meanings. Instead "fraud" and "error" refer to each of the following cases: (1) instances where an incorrect answer is intentionally submitted or where the submission is intended to deceive the evaluator in some manner; (2) instances where an answer is submitted without regard to its correctness or accuracy; (3) instances where an answer has an error or is deficient in some way; or (4) potential instances of any of the above answer categories.

Candidate Answer Fraud (CAF) Model 412

The Candidate Answer Fraud (CAF) model 410 determines the likelihood of a submitted answer as being wrong based on worker characteristics. This determines whether a specific answer to a worker assignment is to be marked as an outlier by identifying assignments that deviate in behavioral features from the "Peer Group", the group of high performing workers. It uses the Peer Groups to compare the characteristics of the current answer with the historical behavior of known correct answers. Peer Groups may be the Global Worker Guilds (GWGs) discussed above.

In certain embodiments, candidate for answer error detection module 410 uses candidate answer fraud ("CAF") model 412 that implements an outlier model based on behavioral features of a feature vector ("FV"). Possible components of the FV for the CAF model include any trackable worker characteristics. One example feature vector includes components such as historical accuracy for the worker that completed the task, average time spent on each question, exact times spent on agreements with other workers for the same instance of a question, time of day the answer was given, etc., as well as characteristics of the task itself such as the type of questions being answered, length of the instructions, and number of questions per task.

In certain embodiments, CAF model 412 identifies out of character worker behavior and flags answers for extension. CAF model 412 additionally prevents flagged or fraudulent answers from being passed through the delivery. In certain embodiments, CAF model 412 provides a framework for statistical improvements to quality, and for analyst review of worker performance (number of candidate fraud, number of confirmed fraud) for evaluating a worker for a hire-fire decision.

CAF model 412 may additionally allow starting 1+0 pipelines with a safety net in place that bad behavior will be caught unsupervised. This may largely reduce the number of questions that need to be sent for adjudication. The term "1+0" as used herein may refer to a scenario in which an answer does not need to be adjudicated such that answers to those questions are accepted after a single worker answer. Thus, tasks or questions can be assigned without any redundancy between workers while error-prone answers are flagged for review.

In certain embodiments, implementing CAF model completes the pipeline and provides for iteration of models. CAF is an unsupervised statistical model based on candidate fraudulent answer detection techniques. It combines two separate ranking mechanisms against thresholds learned over historical data to trigger a "fraud/not fraud" or error prediction for the current submitted answer.

Inputs:
global "normal" feature vector for correct and/or incorrect answers (e.g., correct, or error/fraudulent answers)
feature vector for the current question
Outputs:
prediction of the answer as fraudulent (error) or not
answers are assigned for extend +1 (i.e., assigned to additional workers for completion) if the worker is determined to be a spammer or if the answer is determined to be fraudulent or an error candidate.

"Extend+1" refers to a scenario in which the question is forwarded to more workers to get multiple answers to that question. For example, a confidence e when there is not enough confidence in the answers collected so far. "Spamming" refers to a state of the worker where he/she is submitting (semi)random answers to questions without attempting to get the answer correct.

Train/Eval:
CAF model 412 uses the distance of the feature vector ("FV") from the global Peer Group average to determine the likelihood of fraud. Distance is computed as the number of standard deviations from the global peer group. For the CAF model the global FV is determined by computing a statistical norm or average for each included feature for all workers within the peer group, or guild.

The term "guild" as used herein may refer to any grouping of workers. Workers may be grouped by any applicable feature or other attribute. For example, the Global Worker Feature "Qualifications achieved" may be used to group workers into a guild for high performing workers.

There are 2 variants of the global normal FV. The first variant is constructed using all historical data for similar tasks for each worker in the guild of qualified workers for a given task. After construction, this FV doesn't change while the current task is active. The second variant uses a dynamic FV that is specific to the current task and is updated at intervals as the current task is underway.

Trained Automated Supervisor AKA Supervised "Candidate Fraudulent Answer Detection" (Supervised Model 416)

In certain embodiments, the candidate fraudulent answer detection module uses supervised model 416. The trained supervisor uses instances of confirmed fraud and worker behavioral features to automatically flag worker submissions as candidate fraud. This model will also be a direct channel for business analysts to direct the classification of what constitutes and does not constitute fraud. From a customer perspective, this frames the product as learning to automate the job of the business analyst, and all the analytics that go with that since traditionally business analysts or worker management system operators manually confirm instances of fraud.

Potential instances of fraud can be confirmed either by assignment to additional automated process instances or by manual confirmation by a business analyst or similar human worker. The term "supervised" may refer to manual (e.g., human) supervision and review and/or automated review using trained algorithms that indicate example instances of candidate error answers or fraudulent answers. For example, a series of answers may include attributes that indicate that they may be fraudulent, a mistake, or otherwise incorrect. These answers can be either manually or programmatically reviewed to confirm that they are or are not verified instances of fraud. These confirmed instances of fraud can be used to train an automated supervisor model. For flagging future answers as potential instances of fraud based on correlation with attributes of the confirmed fraud instances.

Benefit to quality: Supervised tuning of the candidate fraudulent answer detection model. Reduction of fraudulent answer. High fidelity delivered answers.

Benefit to cost: Reduces extensions because of fewer false positive extensions from fraud models. Fewer, possibly far fewer, extensions required to bring answers to AQL.

Reasoning: Customer positioning of product.

Inputs:
All historical behavioral features for all campaign answers for all workers in the peer group.
Selected Instances of Confirmed Fraud/error as determined by an external source.

Output: Estimated likelihood that the current answer is fraud based on the behavior of each worker using confirmed error/fraud instances.

Train/Eval: Trained whenever new instances of confirmed fraud are supplied.

Behavioral Answer Accuracy Prediction Model (Supervised Candidate Fraudulent Answer Detection Model 416)

The supervised behavioral prediction model uses behavioral features from each submission to predict the accuracy of a worker answer at submission time. The power of this is that accuracy can be reliably assigned to every answer even with 1+0 and without a silver worker. Silver Workers are colloquial to describe a trained model or algorithm that can be used to automate the current task. Worker accuracies have been shown to vary by as much as 10%, which is far more than working tolerance required for answers to reach AQL. Assigning worker accuracies allows a ranking of all answers for quality and extension regardless of machine automation of task.

"Behavioral features" are specific to how an individual worker behaves and interacts with the task they are undertaking while other features may be worker independent. Behavior features are collected/generated by tracking worker events, e.g. using web browser or desktop.

Supervised candidate fraudulent answer detection model 416 is a model trained only to predict the probability that the answer is not fraud while supervised model 416 is trained to predict the probability that the answer is fraud. The separation of the model is necessary due to the unbalanced proportion of the fraud/not fraud training sets. Though the models are trained as separate models, their predictions will be combined to make a final fraud/not fraud prediction.

Benefit to quality: Provides a ranking of all records by quality during 1+0.

Benefit to cost: Reduces extensions required by focusing only on least accurate answers.

Reasoning: Allows accuracy based implementation of 1+0 processes.

Inputs:
All historical behavioral features for all campaign answers for all workers in the peer group.
Majority answers from those that have been adjudicated Output: A model for each worker that estimates the accuracy of new submissions based on behavior features at submission time.

Train/Eval:
Trained for each worker when the worker has reached 20 adjudicated answers and updated periodically.

Automated Feature Extraction (Automated Extraction Process 417)

Features are automatically extracted and feature optimizations are automatically processed using a process that automatically extracts a large number of specific features from a superset of feature types. Optimization techniques are performed to reduce the number of features to the subset that achieves the best performance for the objective.

Automating the feature extraction provides us with a way of automatically determining the scope needed to obtain high levels of prediction accuracy. For instance, we know via analysis that using the change in average time per question for a window of worker answers correlates well with worker accuracy. However we don't know the optimal size of the window for each worker. Automatic feature discovery allows us to search this space of window size for each worker to get the best results.

Unsupervised CAF Model (412)

Uses qualified workers to the campaign as Peer Group. At its basic level this method splits the campaign workers into two groups; those determined to be good, stable, and high-accuracy workers and those who are not—spammers, others.

Data requirements: C2 or higher, H5 or higher

Inputs:
global "normal" feature vector
feature vector for the current question

Output:
prediction of the answer as "fraud" or not
assigned for Extend +1 if the worker is determined to be a spammer.

Train/Eval:
This algorithm uses the distance of the feature vector from the global Peer Group average to determine the likelihood of fraud. Distance is computed as the number of standard deviations from the global peer group.

Unsupervised CAF Model Version 2 (412)

Use GWGs as Peer Groups. If there is enough worker data then the worker will be part of the GWG with a weighting of "1".

Data requirements: H5 or higher.

Inputs:
GWGs and representative "normal" feature vector information
feature vector for the current question Output:
prediction of the answer as "fraud" or not
sent for Extend +1 if the worker is determined to be a spammer.

Train/Eval:
This algorithm uses the distance of the feature vector from the GWG average feature vector to determine the likelihood of fraud. Distance is computed as the number of standard deviations from the global peer group.

Supervised CAF Model (416)

Add a supervised "candidate fraudulent answer detection" model using labelled examples of known non fraud answers only. Combine the output of this model with unsupervised CAF approach outlined above.

Inputs:
Trained prediction model
Features associated with the current answer (to be researched).

Output:
Probability of the current answer as fraud.

Train/Eval:
To be combined with unsupervised GWG comparison for final fraud decision.

Combination CAF Model (417)

IBCC or WCA combination between historical GWG and task-specific GWG. This happens when we have both enough worker data completed for this task plus historical similarities already established for the worker/task.

Inputs:
large GWG and associated global representative feature vector information for all related historical data.
smaller in-task GWG and associated representative feature vector
feature vector for the current question
Output:
prediction of the answer as "fraud" or not
sent for Extend +1 if the worker is determined to be a spammer.
Train/Eval:
This algorithm uses the distances of the feature vectors from the large and small GWGs to determine the likelihood of fraud. Distance is computed as the number of standard deviations from the global peer group.
The IBCC or WCA algorithm will be used to combine the separate models into a single prediction.
This will also be combined with all previous steps.
Trained Automated Supervised Model (416)
This Trained Automated Supervisor model predicts and scores each assignment by its potential to be fraudulent. In certain embodiments, only positive examples as the training data input to this model. It will be combined with the model described in V2.
Inputs:
The feature vector for this answer.
The trained model.
Output:
A binary prediction of this answer as fraud.
A probability associated with the prediction.
Train/Eval:
Needs gold data with instances of confirmed fraud for training. This will produce a machine learning model that predicts if an answer is an instance of fraud.
This will be combined with the supervised model trained on only non-fraud instances.
This will also be combined with all other steps in the CAF portion of the platform.
Silver Worker Integration with Weak Classifier Aggregation (e.g., IBCC) AKA Answer Confidence Evaluation (ACE) and Calculate Answer Accuracy (CAA)
Calculate Answer Accuracy Box 2 is IBCC or WCA without Silver Worker (514)
Calculate Answer Accuracy with Silver Worker Box 2 (434)
Check for AQL Box 2 (524)
In certain embodiments, an algorithm that combines multiple "weak" independent classifiers into a single, more accurate, predictor is used. For example, Independent Bayesian Classifier Combination ("IBCC") may be used. IBCC is a state-of-the-art ensemble algorithm for combining the predictions of independent classifiers, or multiple 'weak' learners, for a given event into a single prediction. It is a supervised algorithm that requires labelled training data. For input it uses the outputs of multiple independent weak learners from which it learns for which events each individual learner makes accurate predictions and those for which they produce lower accuracy predictions. Inference is done via a Bayesian averaging approach that combines the outputs of multiple weak agents or models over the test data to produce better predictions than are otherwise achievable by a single weak learner.
The teachings of the present disclosure may reference algorithms for Weak Classifier Aggregation and IBCC. Those of ordinary skill in the art will appreciate that one such algorithm for Weak Classifier Aggregation ("WCA") is IBCC. However, the teachings of the present disclosure are not limited to implementation of Weak Classifier Aggregation using IBCC, or any other particular algorithm listed herein. Instead, any such algorithm that combines weak predictors may be used. Any references to IBCC herein may be implemented using any Weak Classifier Aggregation algorithm, such as, for example, IBCC.

The integration of silver workers directly with IBCC allows us to shift over entirely to accuracy based extension and AQL. Automation shows that moderately performing algorithms are not sufficient to replace workers in 1+0 applications; but instead silver workers raise overall answer accuracies significantly. This produces much greater worker accuracy estimation and AQL based decision making (and subsequent reduced extensions) with even moderately performing algorithms. This sets up for matching tasks to workers and utilization of low accuracy workers. Moderately performing algorithms refer to algorithms which are not able to automate the work with AQL reached.

IBCC or WCA may also refer to an algorithm that combines multiple agent responses to the same question into a single answer. Since the output of the agents is used as input, IBCC has the ability to combine agents of any data type (e.g., human agents with automated agents) in one analysis. Silver Workers are colloquial to describe a trained model or algorithm that can be used to automate the current task.

The Answer Confidence Estimation, or ACE, algorithm is used to keep track of the error rate of a stream of answers for either an individual worker or all workers for a given task to determine the overall quality of the data up to and including the current answer. The algorithm makes use of a combination approach, specifically IBCC or other Weak Classifier Aggregation Algorithm, to track the confidence probability of worker's answers over time. It works by checking if the last answer keeps the worker or task over the required AQL level. If the confidence does remain above AQL the last answer is marked as ready for delivery to the client. If the confidence of the last answer causes the combined AQL to fall below the requirement it marks the last question for further answers and predicts how many additional labels are required for the question to get above required AQL.

In certain embodiments, a Transfer Learning IBCC (TLIBCC) algorithm is used (e.g., in the Calculate Answer Accuracy with Silver Worker Box 434). TLIBCC extends any Weak Classifier Aggregation or IBCC algorithm to make predictions about which workers are suited to answering different types of questions. While IBCC, for example, serves to predict the posterior confidence of a worker's answer, TLIBCC gives a probability of a worker answering a specific type of question correctly before it is answered by that worker. It uses shared features, both latent and explicit, between both workers and questions to match between the two. The feature vector for a question is the required skills needed to answer the question accurately. The feature vector for the worker is the set of skills the worker has demonstrated. During inference, TLIBCC learns the right values for the feature vector for each worker for each question. During testing we can match worker skill vectors to the question requirement skills.

This probability is used for various tasks in the Worker Fitness platform such as matching the best workers to a question, building clusters of questions or workers based on similar feature vectors, or tracking the change in worker performance over the a given timeline.

Benefit to quality: Much improved answer accuracies. Faster measurement of worker accuracies without extension.

Best method for identifying 'hard' answers that require extension for the purpose of reaching AQL.

Benefit to cost: Allows us to deliver much higher AQL with same workforce. Reduced extensions for measuring worker accuracies. Statistical evaluation of worker answers is first step to assigning intrinsic 'information value' to each worker submission for scenario of total process optimization of cost.

Tasks are matched to historically high accuracy workers for the given task type. Low accuracy workers are excluded increasing the quality of the final data.

Reasoning: Integration of all answer systems on probability level for decision making.

Inputs:
All answers from all workers in the campaign.
trained automation algorithm score for each question in campaign. In certain embodiments, the trained automation algorithm score includes the output of the silver worker.

Outputs:
confusion matrix for each worker showing average performance throughout the campaign
answer confidence for every answer in the campaign
binary decision as to whether the record's answers to date satisfy task-level AQL
If not, the estimated number of additional labels required for this answer to reach task-level AQL.

A confusion matrix includes a matrix that matches actual labels to predicted labels so describes the performance of a worker/algorithm. Answers from all workers in the campaign and trained automation algorithm scores can be used to generate confusion matrices via an algorithm. For example, such an algorithm was developed by Edwin Simpson, a consultant at the University of Oxford. However, references to a confusion matrix are not limited to any particular implementation.

Supervised IBCC Integration AKA Supervised Answer Confidence Evaluation (ACE) and Supervised Calculate Answer Accuracy (CAA)

Calculate Answer Accuracy Box 3 (516)
Calculate Answer Accuracy with Silver Worker Box 3 (436)
Check for AQL Box 3 (526)

The integration of IBCC or WCA with the behavior-based accuracy prediction model will be the first existing model that integrates accuracy and behavior based information about a worker into a single (and consistent) scoring of answer accuracy. Worker accuracies have been shown to vary by as much as 10%, and integrating these two models allows us to instantly declare answers as above AQL, and to incorporate worker behavior (psychology) directly into our analysis of an answer against AQL.

Benefit to quality: Highest fidelity worker and answer accuracy prediction possible. Through IBCC or WCA this propagates behavioral characteristics to all workers and answer accuracies even when most of the answers are provided by 1+0. Best method for identifying 'easy' answers that require no extension for the purpose of reaching AQL.

Benefit to cost: Reduced extension for answers that indicate high worker accuracy. More reliable way to deliver set-wide AQL at lowest cost.

Reasoning: Integration of all worker information into determination of worker and accuracy information.

Inputs:
all answers from all workers from the campaign
all scores and all labels that are assigned to human tasks by automation algorithm in campaign. A "label" is another way of denoting the answer provided for a question. In this context each worker provides an answer, or label, for each document. If the predicted accuracy of a given worker's answer is low then more answers are required to maintain required data quality.
historical accuracy prediction for all workers in campaign (if available)

Outputs:
accuracy confusion matrix for each worker in campaign
answer accuracy (confidence) for each answer in campaign
determination whether the current worker requires extension of their answer in order to measure worker accuracy Train/Eval:
IBCC or WCA is a deterministic algorithm that may not require training.
Requires automation is available for the Silver Worker.

Global Task Similarity AKA Task Similarity Cluster
Task Similarity Cluster Box 1 (440)

The global task similarity process uses accuracy-based, behavioral, and analyst-created features across all historical tasks and workers to score (between 0.0 and 1.0) the similarity of two tasks. The similarity matrix is symmetric. The similarity is qualitatively defined as a measure of how well a worker from one task will perform on the other. The power of this is that upon the creation of a new task, the performance (accuracy or behavior) of any worker in the system can be predicted on the new task. This allows several features: a priori estimation of that worker accuracy on the new task, pre-qualification of workers on new tasks, identification and automated solicitation of workers at task creation.

Benefit to quality: Task similarity is a measure of consistency for the analysts. Task similarity allows workers to more quickly and easily identify tasks they want to work on, improving our worker pool and efficiency, and improving all quality.

Benefit to cost: Increases number of likely-qualified workers available for new tasks. Faster adoption of tasks by workers. Reduces the number of workers that will take on a task and perform poorly.

Reasoning: Task type-wide connection of workers to tasks is a major feature upgrade.

Input:
feature vectors for current campaign task and all similar task types
Task global similarity matrix as known to date.

Output: matrix of task similarity weight/score between every pair of campaigns matching that task type.

Train/Eval:
Trained with the clustering algorithm using worker feature vectors as input. Run once each day at midnight Global Worker Guilds AKA Worker Similarity Clusters (450)
Worker Similarity Clusters Box 1 and Box 2 (450)

The global worker guilds use accuracy-based features across all historical tasks and workers to identify clusters of workers with similar performance-based characteristics. Accuracy-based features are useful for identifying workers that would perform well on a new task based on workers already performing well on the task. Global Worker Guilds also allow us to build peer groups based on historical performance for better comparison in candidate fraudulent answer detection.

Benefit to quality: Identifying similar workers improves our ability to detect out-of-character behavior. It also allows us to grow the number of workers on a task.

Benefit to cost: Better candidate fraudulent answer detection reduces cost of false negatives. Larger worker pool ramps tasks up more quickly and allows us to select more top quality workers for our tasks.

Reasoning: Primary source of using historical data on workers and tasks for new task performance.

Input:
all worker assignments for all campaigns with the same task type.
accuracy (for GWGA) and/or behavioral (for GWGB) features for each worker that has passed qualification. In certain embodiments, GWG refers to Global Workers Guild. GWGA refers to GWG accuracy. GWGB refers to GWG behavioral.

Output: assignment of a similarity weight between each worker qualified for the task to their Global Worker Guild (GWG) and the Peer Group to be used while calculating fraud probability.

Train/Eval:
Trained with the clustering algorithm using worker feature vectors as input. Run once each day at midnight.

Supervised IBCC or WCA Integration with CAF AKA Total Answer Confidence Evaluation ("TACE")

Check for AQL Box 4 (528)

The Total Answer Confidence Evaluation (TACE) uses IBCC or WCA, a supervised per-worker accuracy estimation at submission time, and a score from the CAF model to particularly include the results of potentially fraud answers in the final evaluation of answer confidence evaluation. The power of TACE is that the CAF model likely produces many false positives that are omitted from the calculation of answer confidence. This additional overhead could reduce our necessary extension by up to 90% depending on the tolerance threshold we set for the CAF models.

Benefit to quality: not excluding CAF answers that may be of partial or acceptable quality; overall increase in answer confidence at same extension rate; reduced extension Benefit to cost: fewer extensions needed to reach AQL Reasoning: This additional overhead due to false positive declarations of fraud will reduce our necessary extension by a lot (up to 90%) depending on the tolerance threshold we set for the CAF models.

Inputs:
all answers from all workers from the campaign
all scores and all labels assigned to HITS by automation algorithm in campaign
historical accuracy prediction for all workers in campaign (if available)
behavioral features for all assignments in the campaign Outputs:
accuracy confusion matrix for each worker in campaign
answer accuracy (confidence) for each answer in campaign Train/Eval:
IBCC or WCA is a deterministic algorithm that requires no training. It requires a trained automation algorithm.

One submission accuracy model is trained for each worker based on campaign behavioral features and previous answers marked as correct or not. This model will be trained periodically throughout the worker's participation on the campaign, and likely not after each submission.

Best Worker Available ("BWA") (460)

The BWA algorithm is used to match the best available worker to the next question in need to answering on the platform. It may use TLIBCC directly as described above and/or also combines other models and methods with any number of task-specific features. An example listing of features, including task-specific features, is described above. The Best Worker Available algorithm ranks and matches each worker in the worker pool against a specific instance/record of a HIT. The ranking and matching algorithm optimize on factors such as predicted worker accuracy on the specific record, predicted worker likelihood to accept the specific record (preference), current answers for the record provided by other workers or machines, confidence in the accumulated answers, behavioral features, and system-wide AQL.

Benefit to quality: matching workers to tasks will utilize workers for the tasks they are good at, increasing overall output of performance by worker pool; matching tasks to workers (preference) will increase the rate at which campaigns progress due to reduced worker dropout.

Benefit to cost: fewer extensions required; more reliable service delivery from crowd.

Reasoning: addressing task and worker matching produces more productive and happier crowds.

Inputs
all worker behavioral features and associated models
next question task record (e.g., see listing of task specific features above)

Outputs:
a ranking and score for each workers' estimated performance on that record Training:
The BWA model is deterministic but has dependencies on other models which have training requirements, such as those illustrated in FIGS. 4A-4C and discussed throughout this document.

Global Trained Supervisor (440)

The Global Trained Supervisor is an extension to the Trained Automated Supervisor that extends training data by using historical accuracy and behavioral characteristics for each work and each task to determine Candidate Answer Fraud in the current task. More technically, the Global Trained Supervisor merges Global Worker Guilds, Global Task Similarity, and Trained Automated Supervisors from across tasks through IBCC or WCA to produce a superior algorithm. Much improved CAF performance is expected after Peer Groups are established by historical performance and behavior. This also allows us to turn on candidate fraudulent answer detection much earlier in the task process.

Benefit to quality: all benefits of improved candidate fraudulent answer detection.

Benefit to cost: all benefits of improved candidate fraudulent answer detection, fewer records need to be processed before a worker can transition to 1+0 with CAF.

Reasoning: much improved CAF performance is expected by creating

Inputs:
large GWG and associated global representative feature vector information for all related historical data.
smaller in-task GWG and associated representative feature vector
feature vector for the current question Output:
prediction of the answer as "fraud" or not
sent for Extend +1 if the worker is determined to be a spammer.

Train/Eval:
This algorithm uses the distances of the feature vectors from the large and small GWGs to determine the likelihood of fraud. Distance is computed as the number of standard deviations from the global peer group.

The IBCC or WCA algorithm will be used to combine the separate models into a single prediction.

This will also be combined with all previous steps.

Extend +1

The Extend +1 subflow compliments the traditional adjudication procedure currently in use in the WF platform by adding a Best Worker Accuracy (BWA) model which predicts worker accuracies for the next question. This step will help us serve the right questions to the right worker to optimize the overall AQL of the task at the lowest cost.

Global Task Similarity Clusters

This is used when the worker has not completed enough in-task work for this campaign. The purpose of the Global Task Similarity (GTS) model is to assign a weighted similarity score from similar tasks the worker has completed in the past to provide reliable estimates of his accuracy/behavior for this task type.

Input:
feature vectors for current task
Task global similarity matrix.
Output: task similarity weight/score.
Train/Eval:
Trained with the clustering algorithm using worker feature vectors as input. Run once each day at midnight.

Global Worker Guild Similarity Weighted Clusters

This is used when there is not enough worker specific historical data for this or similar historical task types to directly estimate their performance on this task. The purpose of the Global Worker Guild (GWG) models is to assign a similarity score to weight the candidate fraudulent answer detection models. This is done by finding similar groups of workers who already have submitted enough data for this task or other task like it. GWGs are produced based on two different ways: accuracy-based features (GWGA) and the other on behavioral-based features (GWGB). The interface for both GWGA and GWGB should be identical. The separation of the algorithm into two separate parts in the flowchart is to clarify planning in research roadmap only.

Input:
all worker assignments for all campaigns with the same task type.
accuracy (for GWGA) and/or behavioral (for GWGB) features for each worker that has passed qualification.
Output:
assignment of a similarity weight between each worker qualified for the task to their Global Worker Guild (GWG) and the Peer Group to be used while calculating fraud probability.
Train/Eval:
Trained with the clustering algorithm using worker feature vectors as input. Run once each day at midnight.

Each worker with historical data has a unique Global Worker Guild ID. Within a campaign, and for the purpose of candidate fraudulent answer detection, the worker has a Campaign Peer Group ID (CPG). In most cases in which GWG is available, the worker will be assigned the GWG ID and their CPG ID. In other cases, the GPD ID may be determined by one of the algorithms below.

Assigning Worker CPG in Campaign:
When: the worker is assigned their CPG when they join a campaign and at every new data threshold. Which method for assigning CPG is determined by the amount of data available.

Silver Worker? No: Calculate Answer Accuracy (510)

In certain embodiments, an answer accuracy calculation is implemented using the process described in module 512. Answer accuracy module 512 assumes that answer accuracy meets AQL for record level. If computed worker answer accuracy falls below band for worker, i.e., fails majority votes, falls below worker's historical or qualification required average, fails PGA multiple times, doesn't pass gold data checks or maker/checker via SQC, then the worker is a candidate for firing from the task.

Inputs:
all computed in-task accuracy metrics for this worker
Outputs:
assignment of label and answer accuracy to all answers.
determination of whether the current worker needs to be fired.
Train/Eval:
None.

In certain embodiments, an Accuracy Confidence Estimation (ACE) model the individual worker and answer accuracies as sampled and scored by IBCC or WCA. ACE model uses IBCC or any other Weak Classifier Aggregation algorithm and is developed from consultants and predicts the probability of a worker's answer being correct.

Inputs:
all answers from this worker from this campaign
historical accuracy prediction for this worker if available
Outputs:
answer accuracy (confidence) for this answer
determination whether the current worker requires extension of their answer in order to measure worker accuracy In certain embodiments, supervised behavioral answer accuracy prediction model is directly integrated with IBCC or WCA into the ACE algorithm.

The supervised behavioral prediction model uses behavioral features from each submission to predict the accuracy of a worker answer at submission time. The power of this is that accuracy can be reliable assigned to every answer even with 1+0 and without a silver worker. When integrated with IBCC or WCA, IBCC and the prediction model will both generate estimates of answer accuracy. The most likely first-pass solution to this will be to use IBCC or WCA to generate answer accuracies and to train the prediction model as a regression to these accuracies on historical answers. Then, at submission time, the prediction accuracy can be used as the prior for the worker answer accuracy on IBCC or WCA (alpha parameters). The second-pass solution would likely be to train the prediction model and IBCC or WCA jointly Inputs:
all answers from all workers from the campaign
all scores and all labels assigned to HITS by automation algorithm in campaign
historical accuracy prediction for all workers in campaign (if available)
behavioral features for all assignments in the campaign
Outputs:
accuracy confusion matrix for each worker in campaign
answer accuracy (confidence) for each answer in campaign
Train/Eval:
IBCC or WCA is a deterministic algorithm that requires no training.
Requires a trained automation algorithm.

One submission accuracy model is trained for each worker based on campaign behavioral features and previous answers marked as correct or not. This model will be trained periodically throughout the worker's participation on the campaign, and likely not after each submission.

Silver Worker? Yes.

Calculate Answer Accuracy with Silver Worker (430, 432)

Current: No use of Silver Workers in answer accuracy calculations. No Input/Output required.

In certain embodiments, an Answer Confidence Estimation (ACE) model with Silver worker scores is directly integrated with IBCC or WCA worker. (todo: not streaming & merges historical/not-historical)

Inputs:
all answers from all workers from the campaign
all scores and all labels assigned to HITS by automation algorithm in campaign
historical accuracy prediction for all workers in campaign (if available)

Outputs:
accuracy confusion matrix for each worker in campaign
answer accuracy (confidence) for each answer in campaign
determination whether the current worker requires extension of their answer in order to measure worker accuracy Train/Eval:
IBCC or WCA is a deterministic algorithm that requires no training.

Requires automation is available for the Silver Worker.

In certain embodiments, the ACE model with Silver worker scores are directly integrated into IBCC or WCA evaluation algorithm and merged with supervised behavioral answer accuracy prediction model.

The supervised behavioral prediction model uses behavioral features from each submission to predict the accuracy of a worker answer at submission time. The power of this is that accuracy can be reliable assigned to every answer even with 1+0 and without a silver worker. When integrated with IBCC or WCA, IBCC and the prediction model will both generate estimates of answer accuracy. The most likely first-pass solution to this will be to use IBCC or WCA to generate answer accuracies and to train the prediction model as a regression to these accuracies on historical answers. Then, at submission time, the prediction accuracy can be used as the prior for the worker answer accuracy on IBCC or WCA (alpha parameters).

Inputs:
all answers from all workers from the campaign
all scores and all labels assigned to HITS by automation algorithm in campaign
historical accuracy prediction for all workers in campaign (if available)
behavioral features for all assignments in the campaign Outputs:
accuracy confusion matrix for each worker in campaign
answer accuracy (confidence) for each answer in campaign Train/Eval:
IBCC or WCA is a deterministic algorithm that requires no training.

Requires a trained automation algorithm.

One submission accuracy model is trained for each worker based on campaign behavioral features and previous answers marked as correct or not. This model will be trained periodically throughout the worker's participation on the campaign, and likely not after each submission.

Check for AQL (520)

Determine Correct Answer and Check Acceptable Quality

In certain embodiments, task-level AQL is determined using module 522. Correct answers are determined by majority votes. Here a majority could be a single answer if adjudication is 1+0. This is the default way an answer is accepted now.

Inputs:
Current answer with an accuracy score from answer accuracy calculations described above.
All previous accepted answers.

Output:
The number of further workers required for this answer to reach task-level AQL.

Train/Eval:
There is no change here from the current way of accepting an answer into the snapshot.

In certain embodiments, the ACE model is used at the task-level. This is an algorithm for computation of task-level AQL. This portion of the model has as input the question level accuracy score and computes if this satisfies AQL at the task-level.

Inputs: None.

Outputs:
If the answer's accuracy score satisfies task-level AQL.
If not, the number of additional labels required for this answer to reach task-level AQL.

In certain embodiments, supervised behavioral answer accuracy prediction model integration with IBCC or WCA into the ACE algorithm is augmented by adding two complimentary supervised machine learning models. One is trained against labelled examples of accepted answers while the other is trained on labelled examples of rejected. Features for these models still to be researched but will include the final number of labels required for each prior accepted question with other relevant information such as the answer accuracy confidence, task type, type of question being asked, worker statistics, etc.

Inputs:
Answer with the features used to train the supervised models with.
A trained supervised online model for accepted answers that is continually updated with newly accepted answers.

Output:
The number of further workers required for this answer to reach task-level AQL.

Train/Eval:
This model will be combined with all previous steps in the AQL calculation for this answer.

Additional Notes:
Add Algorithm Algorithm. cutoff for silver worker
Add qualifier (quality/cost) of IBCC or WCA out of the box for answer accuracy. better confusion matrix correction for bias, worker confusion tendencies, and
Adjudication done. Gold data & checker measurement of accuracy
Process IBCC or WCA with Gold fixed as 1.0.
Measure efficacy of gold answer. Evaluate gold posterior value of every gold answer.
A Tool for Monitoring the Usefulness-Correctness of Gold Data Throughout Production Tasks
Does bad gold lower overall IBCC or WCA accuracies?
The GTS project consists of three phrases of similarity measure rollout:
Exact task similarity: Tasks created as copies and left unedited are assigned a similarity score of 1.0.
This allows prediction of worker accuracies for all workers in the Universe at task creation time for the trivial (but not yet implemented) case of identical tasks. This allows implementation of all subsystems (accuracy prediction, worker solicitation) to continue forward in parallel to research and development.

Historical task similarity (accuracy-based): Historical task similarity scores are calculated using worker answers across all tasks of the same type. Results are evaluated.

These identify worker clusters (GWGA) and may allow task similarity scores to be calculated once "many" workers have been "at least" qualified.

Historical task similarity (analyst-features based): Historical task similarity scores are recalculated using worker answers across all tasks of the same type and supervised features derived from the set of all metadata available at task-creation.

These identify worker clusters (GWGA) and allow task similarity scores to be calculated at task creation time for new tasks. This allows prediction of worker accuracies for all workers in the Universe at task creation time.

Computer System

Figure 5:
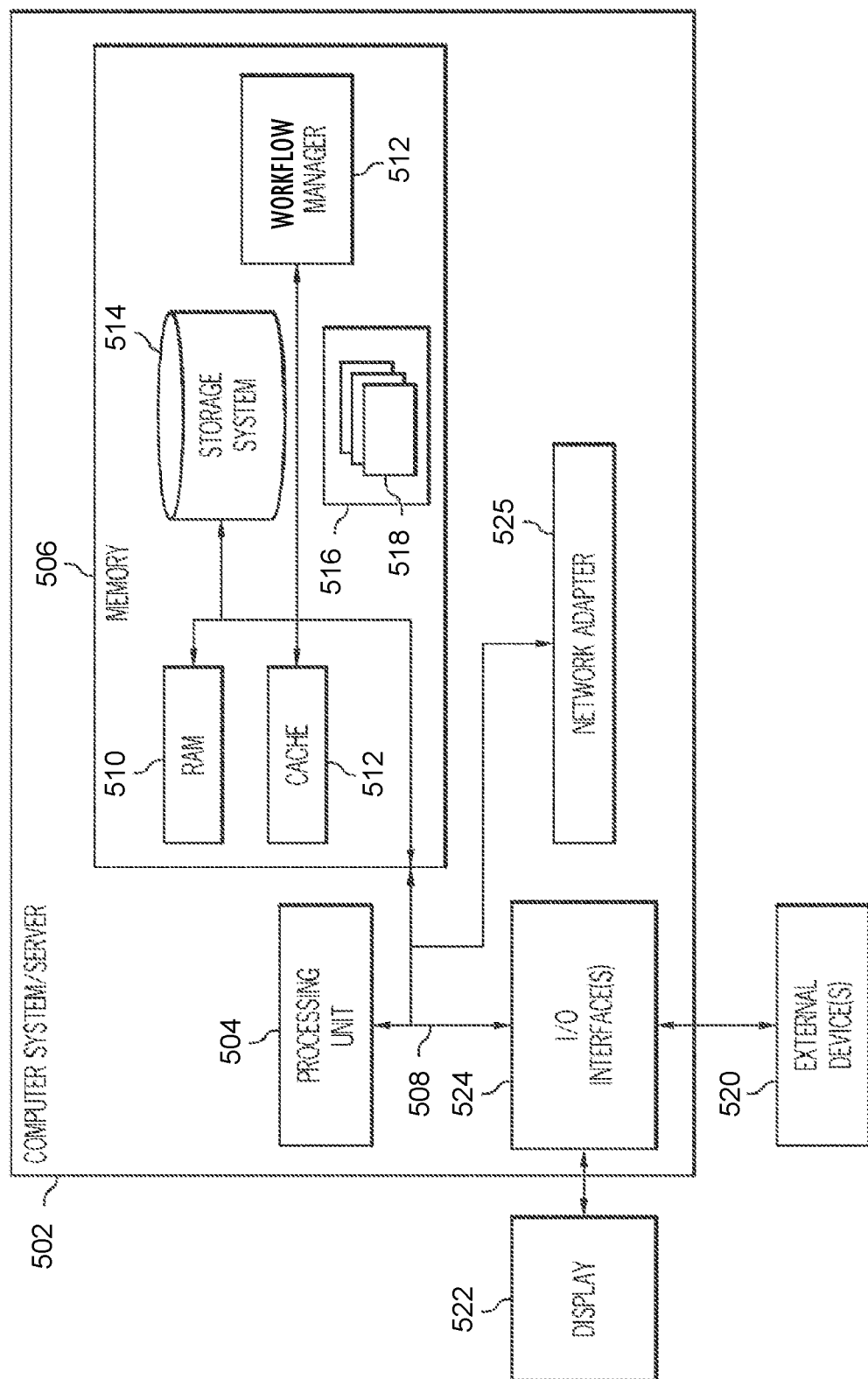
FIG. 5 illustrates one example of an information processing system according to one embodiment of the present invention.

Referring now to FIG. 5, a schematic of an example of an information processing system, such as the server 104 of FIG. 1, is shown. Information processing system 502 is only one example of a suitable system and is not intended to suggest any limitation as to the scope of use or functionality of embodiments of the invention described herein. Regardless, the information processing system 502 is capable of being implemented and/or performing any of the functionality set forth hereinabove.

The information processing system 502 may be a personal computer system, a server computer system, a thin client, a thick client, a hand-held or laptop device, a tablet computing device, a multiprocessor system, a microprocessor-based system, a set top box, a programmable consumer electronic, a network PC, a minicomputer system, a mainframe computer system, a distributed cloud computing system, or the like.

The information processing system 502 is shown in the form of a general-purpose computing device. The components of the information processing system 502 may include, but are not limited to, one or more processors or processing units 504, a system memory 506, and a bus 508 that couples various system components including the system memory 506 to the processor 504.

The bus 508 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The information processing system 502 typically includes a variety of computer system readable media. Such media may be any available media that is accessible by the information processing system 502, and it includes both volatile and non-volatile media, removable and non-removable media.

The system memory 506, in one embodiment, comprises the workforce manager 112, its components, and the various data 212, 214, 216 as shown in FIG. 1. These one or more components may also be implemented in hardware as well. The system memory 506 may include computer system readable media in the form of volatile memory, such as random access memory (RAM) 510 and/or cache memory 512. The information processing system 502 may further include other removable/non-removable, volatile/non-volatile computer system storage media. By way of example only, a storage system 514 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each may be connected to the bus 508 by one or more data media interfaces. As will be further depicted and described below, the memory 506 may include at least one program product having a set (e.g., at least one) of program modules that are configured to carry out the functions of various embodiments of the invention.

Program/utility 516, having a set (at least one) of program modules 518, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. Program modules 518 generally carry out the functions and/or methodologies of various embodiments of the invention as described herein.

The information processing system 502 may also communicate with one or more external devices 520 such as a keyboard, a pointing device, a display 522, etc.; one or more devices that enable a user to interact with the information processing system 502; and/or any devices (e.g., network card, modem, etc.) that enable computer system/server 502 to communicate with one or more other computing devices. Such communication may occur via I/O interfaces 524. Still yet, the information processing system 502 may communicate with one or more networks such as a local area network (LAN), a general wide area network (WAN), and/or a public network (e.g., the Internet) via network adapter 526. As depicted, the network adapter 526 communicates with the other components of information processing system 502 via the bus 508. It should be understood that although not shown, other hardware and/or software components could be used in conjunction with the information processing system 502. Examples, include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    receiving, by one or more processors of an information processing system, results of a benchmark task performed by a plurality of workers via a plurality of worker systems;
    determining, by the one or more processors, respective performances of the plurality of workers on the benchmark task;
    determining, by the one or more processors, first task-specific features descriptive of the benchmark task;
    receiving, by the one or more processors, specification of a new task to be performed by a worker of the plurality of workers;
    determining, by the one or more processors, second task-specific features descriptive of the new task;
    determining, by a best worker available module of the information processing system and using the one or more processors, a plurality of probabilities for each worker of the plurality of workers, wherein at least one of the probabilities corresponds to a predicted probability, determined using a composite answer error model, of the worker accurately responding to the new task based on the performance of the worker on the benchmark task and at least one or the probabilities corresponds to a calculated confidence for the predicted probability of the worker accurately responding to the new task, wherein the plurality of probabilities are determined based at least on:
        task-specific features shared by the first task-specific features and the second task-specific features,
        the respective performance of each worker on the benchmark task, and a comparison of worker characteristics of each worker to the first task-specific features descriptive of the benchmark task and the second task-specific features descriptive of the new task;

identifying, by the best worker available module and using the one or more processors, one or more best workers for the new task from the plurality of workers based at least on the plurality of probabilities;

determining, by the one or more processors, whether at least one of the one or more best workers is available to accept the new task;

in response to determining that the at least one of the one or more best worker is available to accept the new task, assigning, by the one or more processors, the new task to the at least one of the one or more best workers, as identified based on the plurality of probabilities, via communication with a worker system of the at least one of the one or more best workers;

receiving, by the one or more processors, results of the new task performed by the at least one of the one or more best workers via a worker system associated with the at least one of the one or more best workers; and updating, by the one or more processors, the composite answer error model based on the received results of the new task.

2. The method of claim 1, wherein the respective performances of the plurality of workers are determined based on predicted respective worker accuracies on the benchmark task.

3. The method of claim 1, wherein the respective performances of the plurality of workers are determined based on predicted respective worker likelihoods of the plurality of workers to accept the new task.

4. The method of claim 1, wherein the respective performances of the plurality of workers are determined based on second results for the benchmark task provided by a second plurality of workers, different from the plurality of workers.

5. The method of claim 1, wherein the respective performances of the plurality of workers are determined based on an acceptable quality limit.

6. The method of claim 1, wherein identifying one or more best workers for the new task from the plurality of workers based at least on the plurality of probabilities further comprises, for each worker of the plurality of workers:

assigning a weighted similarity score based on the results of the benchmark task as completed by the worker;

identifying a vector of shared features for a task type corresponding to the benchmark task based on skills needed to accurately perform a task of the task type;

identifying a vector of shared features for the worker based on skills demonstrated by the worker; and determining, using a Transfer Learning Independent Bayesian Classifier Combination (TLIBCC) algorithm and based on the weighted similarity score, optimal values for each of the shared features, wherein the probabilities are further based on the optimal values.

7. The method of claim 6, wherein tasks are classified under one or more task types, wherein the task types are based on one or more actions involved in performing the task, a level of difficulty of the task, pre-requisites required for the task, a level of compensation provided for the task, a duration of the task, a minimum number of iterations required for the task, or a maximum number of iterations required for the task.

8. The method of claim 1, further comprising:

in response to determining that none of the one or more best workers are available to accept the new task, assigning, by the one or more processors, the new task to a random worker of the plurality of workers via communication with a worker system of the random worker.

9. The method of claim 1, wherein updating the composite answer error model based on the received results of the new task comprises determining an accuracy of the received results of the new task compared to the predicted probability.

10. One or more computer-readable non-transitory storage media embodying software comprising instructions operable when executed to:

receive, by one or more processors of an information processing system, results of a benchmark task performed by a plurality of workers via a plurality of worker systems;

determine, by the one or more processors, respective performances of the plurality of workers on the benchmark task;

determine, by the one or more processors, first task-specific features descriptive of the benchmark task;

receive, by the one or more processors, specification of a new task to be performed by a worker of the plurality of workers;

determine, by the one or more processors, second task-specific features descriptive of the new task;

determine, by a best worker available module of the information processing system and using the one or more processors, a plurality of probabilities for each worker of the plurality of workers, wherein at least one of the probabilities corresponds to a predicted probability, determined using a composite answer error model, of the worker accurately responding to the new task based on the performance of the worker on the benchmark task and at least one or the probabilities corresponds to a calculated confidence for the predicted probability of the worker accurately responding to the new task, wherein the plurality of probabilities are determined based at least on:

task-specific features shared by the first task-specific features and the second task-specific features, the respective performance of each worker on the benchmark task, and a comparison of worker characteristics of each worker to the first task-specific features descriptive of the benchmark task and the second task-specific features descriptive of the new task;

identify, by the best worker available module and using the one or more processors, one or more best workers for the new task from the plurality of workers based at least on the plurality of probabilities;

determine, by the one or more processors, whether at least one of the one or more best workers is available to accept the new task;

in response to determining that the at least one of the one or more best workers is available to accept the new task, assign, by the one or more processors, the new task to the at least one of the one or more best workers, as identified based on the plurality of probabilities, via communication with a worker system of the at least one of the one or more best workers;

receive, by the one or more processors, results of the new task performed by the at least one of the one or more best workers via a worker system associated with the at least one of the one or more best workers; and update, by the one or more processors, the composite answer error model based on the received results of the new task.

11. The one or more computer-readable non-transitory storage media of claim 10, wherein the respective performances of the plurality of workers are determined based on predicted respective worker accuracies on the benchmark task.

12. The one or more computer-readable non-transitory storage media of claim 10, wherein the respective performances of the plurality of workers are determined based on predicted worker likelihoods of the plurality of workers to accept the new task.

13. The one or more computer-readable non-transitory storage media of claim 10, wherein the respective performances of the plurality of workers are determined based on second results for the benchmark task provided by a second plurality of workers, different from the plurality of workers.

14. The one or more computer-readable non-transitory storage media of claim 10, wherein the instructions operable when executed to identifying one or more best workers for the new task from the plurality of workers based on at least the plurality of probabilities comprise instructions operable when executed to, for each worker of the plurality of workers:
assign a weighted similarity score based on the results of the benchmark task as completed by the worker;
identify a vector of shared features for a task type corresponding to the benchmark task based on skills needed to accurately perform a task of the task type;
identify a vector of shared features for the worker based on skills demonstrated by the worker; and
determine, using a Transfer Learning Independent Bayesian Classifier Combination (TLIBCC) algorithm and based on the weighted similarity score, optimal values for each of the shared features, wherein the probabilities are further based on the optimal values.

15. The one or more computer-readable non-transitory storage claim 14, wherein tasks are classified under one or more task types, wherein the task types are based on one or more actions involved in performing the task, a level of difficulty of the task, pre-requisites required for the task, a level of compensation provided for the task, a duration of the task, a minimum number of iterations required for the task, or a maximum number of iterations required for the task.

16. A system comprising one or more processors and a memory coupled to the processors comprising instructions executable by the processors, the processors being operable when executing the instructions to:
receive results of a benchmark task performed by a plurality of workers via a plurality of worker systems;
determine respective performances of the plurality of workers on the benchmark task;
determine first task-specific features descriptive of the benchmark task;
receive specification of a new task to be performed by a worker of the plurality of workers;
determine second task-specific features descriptive of the new task;
determine, by a best worker available module of the system, a plurality of probabilities for each worker of the plurality of workers, wherein at least one of the probabilities corresponds to a predicted probability, determined using a composite answer error model, of the worker accurately responding to the new task based on the performance of the worker on the benchmark task and at least one or the probabilities corresponds to a calculated confidence for the predicted probability of the worker accurately responding to the new task, wherein the plurality of probabilities are determined based at least on:
task-specific features shared by the first task-specific features and the second task-specific features,
the respective performance of each worker on the benchmark task, and
a comparison of worker characteristics of each worker to the first task-specific features descriptive of the benchmark task and the second task-specific features descriptive of the new task;
identify, by the best worker available module, one or more best workers for the new task from the plurality of workers based at least on the plurality of probabilities;
determine whether at least one of the best workers is available to accept the new task;
in response to determining that the at least one of the one or more best workers is available to accept the new task, assign the new task to the at least one of the one or more best workers, as identified based on the plurality of probabilities, via communication with a worker system of the at least one of the one or more best workers;
receive results of the new task performed by the at least one of the one or more best workers via a worker system associated with the at least one of the one or more best workers; and
update the composite answer error model based on the received results of the new task.

17. The system of claim 16, wherein the respective performances of the plurality of workers are determined based on predicted respective worker accuracies on the benchmark task.

18. The system of claim 16, wherein the respective performances of the plurality of workers are determined based on predicted worker likelihoods of the plurality of workers to accept the benchmark task.

19. The system of claim 16, wherein the respective performances of the plurality of workers are determined based on second results for the benchmark task provided by a second plurality of workers, different from the plurality of workers.

* * * * *